(12) United States Patent
Krumwiede et al.

(10) Patent No.: US 6,274,523 B1
(45) Date of Patent: Aug. 14, 2001

(54) GRAY GLASS COMPOSITION

(75) Inventors: John F. Krumwiede, Cheswick; Anthony V. Longobardo, Butler; Larry J. Shelestak, Bairdford; David R. Haskins, Gibsonia, all of PA (US)

(73) Assignee: PPG Industris Ohio, Inc., Cleveland, OH (US)

( * ) Notice: Subject to any disclaimer, the term of this patent is extended or adjusted under 35 U.S.C. 154(b) by 0 days.

(21) Appl. No.: 08/529,039

(22) Filed: Sep. 15, 1995

Related U.S. Application Data

(63) Continuation-in-part of application No. 08/153,733, filed on Nov. 16, 1993, now abandoned.

(51) Int. Cl.[7] .............................. C03C 3/087; C03C 4/08
(52) U.S. Cl. ................................. 501/71; 501/70
(58) Field of Search ........................... 501/70, 71

(56) References Cited

U.S. PATENT DOCUMENTS

| | | | |
|---|---|---|---|
| Re. 25,312 | 1/1963 | Duncan et al. | 501/71 |
| 1,957,279 | 5/1934 | Linke | 501/71 |
| 2,524,719 | 10/1950 | Tillyer | 501/71 |
| 2,688,565 | 9/1954 | Raymond | 501/71 |
| 2,860,059 | 11/1958 | Molter et al. | 501/64 |
| 2,892,726 | 6/1959 | Smith et al. | 501/57 |
| 3,294,556 | 12/1966 | Harrington | 501/71 |
| 3,294,561 | 12/1966 | Duncan et al. | 501/71 |
| 3,296,004 | 1/1967 | Duncan | 501/71 |
| 3,300,323 | 1/1967 | Plumat et al. | 501/70 |
| 3,411,934 | 11/1968 | Englehart et al. | 427/168 |
| 3,498,806 | 3/1970 | Hammer et al. | 501/71 |
| 3,628,932 | 12/1971 | Inoue et al. | 65/18 |
| 3,660,061 | 5/1972 | Donley et al. | 65/32 |
| 3,723,142 | 3/1973 | Kato et al. | 501/71 |
| 3,967,040 | 6/1976 | Plumat et al. | 428/410 |
| 4,101,705 | 7/1978 | Fischer et al. | 428/220 |
| 4,104,076 | 8/1978 | Pons | 501/66 |
| 4,129,434 | 12/1978 | Plumat et al. | 65/60.52 |
| 4,190,452 | 2/1980 | Fischer et al. | 501/66 |
| 4,294,881 | 10/1981 | Meyer et al. | 428/334 |
| 4,308,319 | 12/1981 | Michelotti et al. | 428/432 |
| 4,336,303 | 6/1982 | Rittler | 428/334 |
| 4,339,541 | 7/1982 | Dela Ruye | 501/71 |
| 4,521,454 | 6/1985 | Kandachi et al. | 427/168 |
| 4,617,206 | 10/1986 | Haisma et al. | 427/374.1 |
| 4,719,126 | 1/1988 | Henery | 427/165 |
| 4,719,127 | 1/1988 | Greenberg | 427/165 |
| 4,728,353 | 3/1988 | Thomas et al. | 65/60.1 |
| 4,792,536 | 12/1988 | Pecoraro et al. | 501/70 |
| 4,798,616 | 1/1989 | Knavish et al. | 65/135 |
| 4,866,010 | 9/1989 | Boulos et al. | 501/71 |
| 4,873,206 | 10/1989 | Jones | 501/71 |
| 4,971,843 | 11/1990 | Michelotti et al. | 428/34 |
| 5,023,210 | 6/1991 | Krumwiede et al. | 501/71 |
| 5,030,593 | 7/1991 | Heitoff | 501/72 |
| 5,070,048 | 12/1991 | Boulos et al. | 501/71 |
| 5,264,400 | 11/1993 | Nakaguchi et al. | 501/71 |
| 5,278,108 | 1/1994 | Cheng et al. | 501/71 |
| 5,308,805 | 5/1994 | Baker et al. | 501/71 |
| 5,318,931 | 6/1994 | Nakaguchi et al. | 501/64 |
| 5,346,867 | 9/1994 | Jones et al. | 501/71 |
| 5,364,820 | 11/1994 | Morimoto et al. | 501/70 |
| 5,393,593 | 2/1995 | Gulotta et al. | 428/220 |
| 5,411,922 | 5/1995 | Jones | 501/71 |
| 5,478,783 | * 12/1995 | Hruby et al. | 501/27 |
| 5,582,455 | 12/1996 | Casariego et al. | 296/146.2 |

FOREIGN PATENT DOCUMENTS

| | | |
|---|---|---|
| 596334 | 4/1990 | (AU) . |
| 735187 | 5/1966 | (CA) . |
| 0 297 404 | 1/1989 | (EP) . |
| 0 349 909 | 1/1990 | (EP) . |
| 0 452 207 | 4/1991 | (EP) . |
| 0 482 535 | 4/1992 | (EP) . |
| 0 536 049 | 4/1993 | (EP) . |
| 2082647 | 12/1971 | (FR) . |
| 2270215 | 4/1975 | (FR) . |
| 2 331 527 | 11/1975 | (FR) . |
| 2690437 | 10/1993 | (FR) . |
| 1331492 | 9/1973 | (GB) . |
| 1512704 | 6/1978 | (GB) . |
| 2071082 | 9/1981 | (GB) . |
| 56-41579 | 9/1981 | (JP) . |
| 91/07356 | 5/1991 | (WO) . |
| 91/11402 | 8/1991 | (WO) . |

OTHER PUBLICATIONS

Glass Colors, V, Examples of the Composition of Colored Glasses, Kocik et al., Fachberichte, Sprechsaal, vol. 121, No. 1, (1988), pp. 42–44 (No month).

JP–57 106 537, Entitled "Bronze Color Plate Glass", Patent Abstracts of Japan, vol. 6, No. 197, Oct. 1982.

"The Behavior of Selenium and Its Compounds During the Melting of a Vitrifiable Batch", by S.A. Glaverbel, Sep. 1967.

"Iron–selenium black glass", A. Paul, Department of Glass Technology, University of Sheffield (No Date).

(List continued on next page.)

*Primary Examiner*—Karl Group
(74) *Attorney, Agent, or Firm*—Andrew C. Siminerio; Kenneth J. Stachel

(57) ABSTRACT

The present invention provides a glass composition having a neutral gray color and a luminous (visible) transmittance within a range that allows the glass to be used as privacy glazing in a vehicle. The glass of the present invention has a standard soda-lime-silica flat glass base composition and uses iron, cobalt and selenium, and optionally nickel, as the colorants. It has also been found that a nickel-free, neutral gray colored glass with a luminous transmittance (C.I.E. illuminant A) of up to 40% at a thickness of 3.9 millimeters may be attained by using as colorants: 0.59 to 0.99 wt. % of the total glass $Fe_2O_3$ (total iron), no greater than 0.30 wt. % FeO; 60 to 180 PPM CoO and 5 to 30 PPM Se. It has been found that a nickel-bearing, neutral gray colored glass with a luminous transmittance (C.I.E. illuminant A) of up to but less than 40% at a thickness of 3.9 millimeters may be attained by using as colorants: 0.35 to 1.1 wt. % of the total glass $Fe_2O_3$ (total iron), no greater than 0.30 wt. % FeO; 60 to 180 PPM CoO; 1 to 30 PPM Se; and 25 to 550 PPM NiO.

21 Claims, No Drawings

OTHER PUBLICATIONS

"Oxidation–Reduction Equilibria In Glass Between Iron and Selenium in Several Furnace Atmosphere", *Journal of The American Ceramic Society*, by Frank Day, Jr. and Alexander Silverman, vol. 25, No. 13, (1942), pp. 371–381 (No month).

"Mechanism of selenium pink colouration in glass", *Journal of Materials Science*, by A. Paul, (1975), pp. 415–421 (No month).

"Selenium in Oxide Glasses, Methods for Increased Retention", W. C. LaCourse, M. Otteneyck and B. Ukwu, American Glass Review, Nov. 1980, pp. 6–9.

"Intermediate Reactions during Fusing of Selenium and some of Its Compounds in a Soda–Lime–Silicate Glass Frit" (1935), Ceramic Abstracts, vol. 14, No. 10, (1935), p. 244 (No month).

"Manufacture of Selenium Rose and Selenium Ruby" (1938), Ceramic Abstracts, vol. 18, No. 6, (1938), p. 152.

"Selenium Dioxide As A Constituent of Glasses", L. Navias and J. Gallup, pp. 441–449 (No Date).

"Behavior of Selenium in Glass", Jul. 1934, pp. 122–125.

"Chemical Approach to Glass" by Milos B. Volf, 1984, pp. 334–339 (No month).

* cited by examiner

GRAY GLASS COMPOSITION

This is a continuation in part application of U.S. patent application Ser. No. 08/153,733, filed Nov. 16, 1993 now abandoned.

BACKGROUND OF THE INVENTION

This invention involves a neutral gray colored glass that has a luminous transmittance that makes it highly desirable for use as privacy glazing in vehicles, e.g. in the rear portions of vans. In particular, the glass of the present invention has a luminous transmittance range of up to 45 percent. The desired color and performance is attained by using iron, cobalt, selenium and/or nickel as colorants. In addition, the glass of the present invention generally exhibits lower infrared and total solar energy transmittance than typical green glasses used in automotive applications to reduce heat gain in the interior of the enclosure. The glass is also compatible with flat glass manufacturing methods.

Various heat-absorbing glass substrates are known in the art. The primary colorant in typical green tinted automotive glasses is iron, which is usually present in both the $Fe_2O_3$ and FeO forms. As is conventional, the total amount of iron present in a glass is expressed herein as $Fe_2O_3$, regardless of the form actually present. Typical green tinted automotive glass has about 0.5 percent by weight total iron with the ratio of FeO to total iron being about 0.25.

Some glasses, e.g. U.S. Reissue Pat. No. 25,312 to Duncan et al. and U.S. Pat. No. 4,339,541 to Dela Ruye, produce a gray color in the glass by including nickel oxide, cobalt oxide and selenium as colorants. However, inclusion of nickel-containing materials must be carefully controlled because the presence of nickel during the melting process sometimes leads to the formation of nickel sulfide stones in the glass. Additional potential problems faced when using nickel include haze formation on the glass surface due to reduction of the nickel in the tin bath and change in the glass color when it is heat treated.

To avoid this problem, nickel-free colored glasses containing iron oxide, cobalt oxide, and selenium were developed, as disclosed in U.S. Pat. No. 3,296,004 to Duncan et al., U.S. Pat. No. 3,723,142 to Kato et al. and British Patent Specification 1,331,492 to Bamford. In U.S. Pat. No. 4,104,076 to Pons, instead of nickel, $Cr_2O_3$ or $UO_2$ are used in combination with iron oxide, cobalt oxide, and selenium to produce gray glass. More recent nickel-free gray glasses are disclosed in U.S. Pat. No. 5,023,210 to Krumwiede et al. and U.S. Pat. No. 5,278,108 to Cheng et al. and EP 536 049 to Alvarez-Casariego, et al., which use iron oxide, cobalt oxide and selenium, as colorants. Krumwiede et al. and Alvarez-Casariego et al. further disclose that chromic oxide may be used as an additional colorant.

Many of the commercially available gray glasses are too dark to be used in the forward vision area of a vehicle. In addition, the glasses may also be too dark to allow safety lighting mounted in the interior of the vehicle from being seen from the exterior of the vehicle. It would be desirable to have a neutral gray glass that provides a dark gray color for use in privacy areas of a vehicle while allowing adequate safety lighting illumination and have a consistent color and further that is compatible with commercial flat glass manufacturing techniques.

SUMMARY OF THE INVENTION

The present invention provides a glass composition having a neutral gray color and a luminous (visible) transmittance within a range that allows the glass to be used as privacy glazing in a vehicle. The glass of the present invention has a standard soda-lime-silica flat glass base composition and uses iron, cobalt and selenium, and optionally nickel, as the colorants. It has been found that a nickel-free, neutral gray colored glass with a luminous transmittance (C.I.E. illuminant A) of up to 40% at a thickness of 3.9 millimeters may be attained by using as colorants: 0.59 to 0.99 wt. % of the total glass $Fe_2O_3$ (total iron), no greater than 0.30 wt. % FeO; 60 to 180 PPM CoO and 5 to 30 PPM Se. In one embodiment, the glass composition includes 0.75 to 0.86 wt% $Fe_2O_3$; 0.18 to 0.25 wt. % FeO; 108 to 144 PPM CoO and 13 to 24 PPM Se. It has been found that a nickel-bearing, neutral gray colored glass with a luminous transmittance (C.I.E. illuminant A) of up to but less than 45% at a thickness of 3.9 millimeters may be attained by using as colorants: 0.35 to 1.1 wt. % of the total glass $Fe_2O_3$ (total iron), no greater than 0.30 wt. % FeO; 60 to 180 PPM CoO; 1 to 30 PPM Se; and 25 to 550 PPM NiO. In one embodiment, the glass composition includes 0.71 to 0.94 wt. % $Fe_2O_3$, 0.181 to 0.24 wt. % FeO, 98 to 150 PPM CoO, 14 to 24 PPM Se, and a minimum of 50 PPM NiO.

The dominant wavelength of the glasses in the present invention may vary somewhat in accordance with particular color preferences. In the present invention, it is preferred that the glass be a neutral gray color characterized by dominant wavelengths in the range of 480 to 580 nanometers, preferably 485 to 560 nanometers, with an excitation purity of no higher than 8%, preferably no higher than 3%.

DETAILED DESCRIPTION

The base glass of the present invention, that is, the major constituents of the glass without colorants, is commercial soda-lime-silica glass characterized as follows:

|  | Weight % |
| --- | --- |
| $SiO_2$ | 66 to 75 |
| $Na_2O$ | 10 to 20 |
| CaO | 5 to 15 |
| MgO | 0 to 5 |
| $Al_2O_3$ | 0 to 5 |
| $K_2O$ | 0 to 5 |
| BaO | 0 to 1 |

To this base glass, the present invention adds colorants in the form of iron, cobalt, selenium and/or nickel. In one particular embodiment of the invention, the glass is essentially nickel-free; that is, no deliberate addition of nickel or nickel compounds is made, although the possibility of traces of nickel due to contamination may not always be avoided. The glass in the present invention is essentially free of other colorants, such as, but are not limited to chromium, manganese, cerium, molybdenum, titanium, chlorine, zinc, zirconium, sulfur, fluorine, lithium and strontium. In particular, the glass composition taught herein does not include chromium as a colorant as does several of the gray colored glasses in the prior art. It has been found the inclusion of chromium tends to reduce the luminous transmittance and total solar energy transmittance and increase the dominant wavelength of the glass. It should be appreciated that the glass compositions disclosed herein may include small amounts of the materials identified above, for example as melting and refining aids, tramp materials or impurities. It should be further appreciated that some of these materials as well as others may be added to the glass to improve the solar performance of the glass as will be discussed later in more detail.

The selenium colorant contributes a pink color to the glass as well as a brown color when complexed with iron to form iron selenide (FeSe). Cobalt produces a blue color. Iron contributes yellow and blue in varying proportions depending upon the oxidation state. Nickel, if used, contributes a green-brown to yellow-brown color.

The glass of the present invention may be melted and refined in a continuous, large-scale, commercial melting operation and formed into flat glass sheets of varying thicknesses by the float method in which the molten glass is supported on a pool of molten metal, usually tin, as it assumes a ribbon shape and is cooled. It should be appreciated that as a result of forming the glass on molten tin, measurable amounts of tin oxide may migrate into surface portions of the glass on the side that was in contact with the tin. Typically, a piece of float glass has an $SnO_2$ concentration of at least 0.05 wt. % in the first few microns below the surface of the glass that was in contact with the tin.

The total amount of iron present in the glass is expressed herein in terms of $Fe_2O_3$ in accordance with standard analytical practice, but that does not imply that all of the iron is actually in the form of $Fe_2O_3$. Likewise, the amount of iron in the ferrous state is reported as FeO, even though it may not actually be present in the glass as FeO. The proportion of the total iron in the ferrous state is used as a measure of the redox state of the glass and is expressed as the ratio $FeO/Fe_2O_3$, which is the weight percent of iron in the ferrous state (expressed as FeO) divided by the weight percent of total iron (expressed as $Fe_2O_3$). Unless stated otherwise, the term $Fe_2O_3$ in this specification shall mean total iron expressed in terms of $Fe_2O_3$ and the term FeO shall mean iron in the ferrous state expressed in terms of FeO.

The glass compositions disclosed in the present invention may be made using any of several types of melting arrangements, such as but not limited to, a conventional, overhead fired continuous melting operation as is well known in the art or a multi-stage melting operation, of the type that is discussed later in more detail. However, for glass compositions having a redox of less than 0.30, the former operation is preferred and for glass compositions having a redox of 0.30 or greater, the latter operation is preferred.

Conventional, overhead fired continuous melting operations are characterized by depositing batch material onto a pool of molten glass maintained within a tank type melting furnace and applying thermal energy until the materials are melted into the pool of molten glass. The melting tanks conventionally contain a large volume of molten glass so as to provide sufficient residence time for currents in the molten glass to affect some degree of homogenization and fining before the glass is discharged into a forming operation.

The multi-stage glass melting and refining operation disclosed in U.S. Pat. No. 4,381,934 to Kunkle et al.; U.S. Pat. No. 4,792,536 to Pecoraro et al.; and U.S. Pat. No. 4,886,539 to Cerutti et al. is characterized by separate stages whereby more flexibility in controlling redox conditions is provided. The overall melting process disclosed in these patents consists of three stages: a liquefaction stage, a dissolving stage, and a vacuum refining stage. In the liquefaction stage, batch materials, preferably in a pulverulent state, are fed into a rotating, drum-shaped liquefying vessel. As batch material is exposed to the heat within the vessel, liquefied material flows down a sloped batch material lining to a central drain opening at the bottom of the vessel. A stream of liquefied material falls freely from the liquefaction vessel into a dissolving vessel for the dissolving stage. The dissolving vessel completes the dissolution of unmelted particles in the liquefied material coming from the liquefaction stage by providing residence time at a location isolated from the downstream refining stage. The dissolving vessel may be in the form of a horizontally elongated refractory basin with the inlet and outlet at opposite ends thereof so as to assure adequate residence time. The refining stage preferably consists of a vertically upright vessel that may be generally cylindrical in configuration having an interior ceramic refractory lining shrouded in a gas-tight, water-cooled casing. As the molten material enters the vessel from the dissolving vessel, it encounters a reduced pressure within the refining vessel. Gases included in the melt expand in volume, creating a foam. As foam collapses, it is incorporated into the liquid body held in the refining vessel. Refined molten material is drained from the bottom of the refining vessel into a receiving chamber and delivered to a float forming chamber.

A stirring arrangement may be employed in the multi-stage process to homogenize the glass after it has been refined in order to produce glass of the highest optical quality. If desired, a stirring arrangement may be integrated with a float forming chamber, whereby the glass in the stirring chamber rests on a layer of molten metal. The molten metal may be continuous with the molten metal constituting the support in the forming chamber, and is usually comprised essentially of tin.

The multi-stage operation discussed above generally operates at a redox level of 0.30 or higher; however, redox levels below 0.30 may be achieved by increasing the amount of oxidizing constituents in the glass batch. For example, manganese oxide may be added to lower the redox level. Redox may also be controlled by adjusting the gas/$O_2$ ratio of the burners.

The transmittance data provided throughout this disclosure is based on a glass thickness of 3.9 millimeters (0.154 inch). Luminous transmittance ($LT_A$) is measured using C.I.E. 1931 standard illuminant "A" over the wavelength range 380 to 770 nanometers at 10 nanometer intervals. Total solar ultraviolet transmittance (TSUV) is measured over the wavelength range 295 to 395 nanometers at 10 nanometer intervals. Total solar infrared transmittance (TSIR) is measured over the wavelength range 775 to 2125 nanometers at 50 nanometer intervals. Total solar energy transmittance (TSET) represents a computed value based on measured transmittances from 275 to 2125 nanometers at 50 nanometer intervals. All solar transmittance data is calculated using Parry Moon air mass 2.0 solar data. Glass color in terms of dominant wavelength and excitation purity are measured using C.I.E. 1931 standard illuminant "C" with a 2° observer.

To determine this transmittance data, the transmittance values are integrated over the wavelength range [a,b]. This range is divided into n equal subintervals of length h by points $\{X_0, X_1, \ldots, X_n\}$ where $X_i = a + (i \times h)$. In the present discolsure, the Rectangular Rule is used to compute the transmittance data. An interpolating function is used to approximate the integrand f in each subinterval. The sum of integrals of this function provides an approximation of the integral:

$$I = \int_a^b f(X) \, dX$$

In the case of the Rectangular Rule, a constant value $f(X_i)$ is used as an approximation of $f(X)$ on $[X_{i-1}, X_i]$. This yields a step-function approximation of $f(X)$ on $[a,b]$, and the numerical integration formula:

$$I = \sum_{i=1}^{n} f(X_i) \times h$$

Tables 1 and 2 illustrate examples of glass compositions at a 3.9 mm (0.154 in.) reference thickness which embody the principles of the present invention. Only the colorant portions of the examples are listed in the table below, with $Fe_2O_3$ being total iron, including that present as FeO.

The information provided in Examples 1 to 29 of Table 1 and Examples 41 to 68 of Table 2 are based on a computer model that generates theoretical spectral properties based on the glass compositions. The compositions in Table 1 exclude nickel oxide as a colorant while the compositions in Table 2 include nickel oxide as a colorant. In addition, the information provided in Examples 30 to 33 in Table 1 is based on experimental laboratory melts and the information for Examples 34 to 40 of Table 1 is based on actual glass produced using the multi-stage melting process discussed earlier. However, under certain conditions, it may be preferred that the glasses disclosed in the present invention be made using a conventional, overhead fired continuous melting process as discussed earlier.

It should be noted that Examples 1 to 29 in Table 1 were modeled to include up to 1 PPM NiO; 6 to 13 PPM of $Cr_2O_3$ and up to 46 PPM $MnO_2$, each of which are considered to be tramp and/or residual levels of these materials, to better reflect the expected spectral properties of the glass. The analysis of Examples 30 to 33 in Table 1 showed less than 3 PPM NiO and from 6 to 13 PPM $Cr_2O_3$ and the analysis of Examples 34 to 40 showed less than 3 PPM NiO and between 5 to 9 PPM $Cr_2O_3$. In addition, the analyses showed that Examples 35, 37, 38 and 40 included up to 46 PPM $MnO_2$ and Examples 34, 36, and 39 included 566 PPM; 940 PPM and 1208 PPM $MnO_2$, respectively. Manganese was added to these later glass compositions to control redox in a manner as discussed earlier. It is believed that the level of $MnO_2$ in Examples 34, 36 and 39 will slightly lower $LT_A$, TSUV and TSET and may operate as a weak colorant imparting a yellow/green color component in the glass. The modeled compositions in Table 2 included up to 13 PPM $Cr_2O_3$.

The representative base glass composition for the examples is as follows:

| | |
|---|---|
| $SiO_2$ | 71 to 75% by weight |
| $Na_2O$ | 13 to 14 |
| CaO | 8 to 9 |
| MgO | 3 to 4 |
| $Al_2O_3$ | 0.1 to 0.7 |

It should be appreciated that this composition may vary especially as a result of the actual amount of colorant present in the glass composition.

TABLE 1A

| | 1 | 2 | 3 | 4 | 5 | 6 | 7 | 8 | 9 | 10 |
|---|---|---|---|---|---|---|---|---|---|---|
| $Fe_2O_3$ wt. % | 0.59 | 0.59 | 0.59 | 0.60 | 0.60 | 0.60 | 0.65 | 0.65 | 0.65 | 0.70 |
| FeO wt. % | 0.156 | 0.156 | 0.156 | 0.159 | 0.159 | 0.153 | 0.172 | 0.172 | 0.172 | 0.185 |
| Redox | 0.265 | 0.265 | 0.265 | 0.265 | 0.265 | 0.255 | 0.265 | 0.265 | 0.265 | 0.265 |
| CoO PPM | 140 | 155 | 80 | 127 | 150 | 65 | 179 | 80 | 116 | 179 |
| Se PPM | 22 | 11 | 29 | 22 | 12 | 9 | 13 | 29 | 19 | 19 |
| $LT_A$ | 34.23 | 38.13 | 38.61 | 35.77 | 38.12 | 52.43 | 33.46 | 37.97 | 38.31 | 30.20 |
| TSIR | 34.77 | 35.05 | 34.68 | 34.26 | 34.49 | 34.99 | 31.84 | 31.59 | 31.79 | 29.32 |
| TSUV | 24.36 | 30.24 | 21.35 | 24.13 | 29.34 | 26.05 | 27.16 | 20.00 | 24.29 | 22.86 |
| TSET | 36.06 | 39.02 | 36.80 | 36.29 | 38.53 | 43.48 | 35.24 | 34.80 | 36.05 | 31.87 |
| DW nm | 549.3c | 478.3 | 585.0 | 496.1c | 478.2 | 524.4 | 477.6 | 584.1 | 504.2c | 475.1 |
| Pe % | 2.48 | 12.48 | 14.75 | 1.51 | 10.91 | 1.13 | 14.14 | 14.9 | 0.71 | 9.0 |

TABLE 1B

| | 11 | 12 | 13 | 14 | 15 | 16 | 17 | 18 | 19 | 20 |
|---|---|---|---|---|---|---|---|---|---|---|
| $Fe_2O_3$ wt. % | 0.70 | 0.70 | 0.71 | 0.710 | 0.75 | 0.80 | 0.82 | 0.82 | 0.82 | 0.845 |
| FeO wt. % | 0.185 | 0.185 | 0.181 | 0.181 | 0.198 | 0.212 | 0.205 | 0209 | 0.209 | 0.211 |
| Redox | 0.265 | 0.265 | 0.255 | 0.255 | 0.265 | 0.265 | 0.25 | 0.255 | 0.255 | 0.25 |
| CoO PPM | 135 | 150 | 98 | 75 | 130 | 120 | 120 | 124 | 100 | 124 |

TABLE 1B-continued

|  | 11 | 12 | 13 | 14 | 15 | 16 | 17 | 18 | 19 | 20 |
|---|---|---|---|---|---|---|---|---|---|---|
| Se PPM | 21 | 10 | 17 | 14 | 15 | 18 | 18 | 16 | 20 | 19 |
| $LT_A$ | 34.30 | 38.24 | 43.63 | 48.81 | 37.59 | 36.78 | 36.39 | 39.28 | 40.42 | 35.43 |
| TSIR | 29.34 | 29.59 | 29.44 | 29.53 | 27.31 | 25.25 | 26.75 | 24.89 | 24.85 | 25.80 |
| TSUV | 22.08 | 27.43 | 20.72 | 21.85 | 23.62 | 21.15 | 18.78 | 18.30 | 17.14 | 18.08 |
| TSET | 33.04 | 35.96 | 36.51 | 38.60 | 33.65 | 31.75 | 32.26 | 32.38 | 32.32 | 31.31 |
| DW nm | 559.7c | 480.0 | 562.5 | 563.0 | 481.1 | 486.2 | 552.0 | 495.0 | 569.1 | 550.4 |
| Pe | 1.39 | 12.48 | 2.7 | 3.88 | 5.25 | 1.11 | 0.52 | 2.39 | 5.41 | 0.51 |

TABLE 1C

|  | 21 | 22 | 23 | 24 | 25 | 26 | 27 | 28 | 29 | 30 |
|---|---|---|---|---|---|---|---|---|---|---|
| $Fe_2O_3$ wt. % | 0.85 | 0.90 | 0.935 | 0.95 | 0.98 | 0.98 | 0.98 | 0.99 | 1.10 | 0.818 |
| FeO wt. % | 0.225 | 0.238 | 0.261 | 0.251 | 0.259 | 0.259 | 0.259 | 0.262 | 0.281 | 0.245 |
| Redox | 0.265 | 0.265 | 0.279 | 0.265 | 0.265 | 0.265 | 0.265 | 0.265 | 0.255 | 0.300 |
| CoO PPM | 100 | 140 | 148 | 110 | 179 | 179 | 115 | 127 | 124 | 126 |
| Se PPM | 23 | 24 | 23 | 20 | 29 | 11 | 17 | 18 | 20 | 18 |
| $LT_A$ | 36.29 | 30.56 | 27.95 | 35.55 | 24.20 | 31.59 | 36.18 | 34.07 | 34.43 | 32.68 |
| TSIR | 23.32 | 21.56 | 18.09 | 20.09 | 18.98 | 19.28 | 19.24 | 18.93 | 16.35 | 19.66 |
| TSUV | 18.22 | 16.90 | 13.21 | 17.46 | 14.05 | 20.12 | 17.98 | 17.42 | 12.17 | 20.86 |
| TSET | 29.88 | 26.81 | 23.58 | 27.94 | 22.71 | 27.21 | 27.94 | 26.94 | 24.95 | 26.75 |
| DW nm | 579.4 | 584.8 | 500.3 | 569.5 | 518.6c | 481.1 | 498.4 | 491.2 | 551.0 | 488.8 |
| Pe | 6.95 | 1.38 | 0.97 | 2.98 | 1.23 | 15.35 | 1.34 | 2.07 | 3.67 | 2.79 |

TABLE 1D

|  | 31 | 32 | 33 | 34 | 35 | 36 | 37 | 38 | 39 | 40 |
|---|---|---|---|---|---|---|---|---|---|---|
| $Fe_2O_3$ wt. % | 0.826 | 0.93 | 0.935 | 0.657 | 0.803 | 0.811 | 0.816 | 0.817 | 0.822 | 0.825 |
| FeO wt.% | 0.257 | 0.257 | 0.261 | 0.190 | 0.212 | 0.212 | 0.186 | 0.215 | 0.216 | 0.236 |
| Redox | 0.313 | 0.276 | 0.279 | 0.289 | 0.264 | 0.261 | 0.228 | 0.264 | 0.263 | 0.286 |
| CoO PPM | 105 | 120 | 128 | 66 | 118 | 120 | 121 | 124 | 124 | 124 |
| Se PPM | 17 | 19 | 19 | 11 | 18 | 17 | 20 | 18 | 16 | 19 |
| $LT_A$ | 35.83 | 31.95 | 31.19 | 51.83 | 36.15 | 36.56 | 36.38 | 35.93 | 36.13 | 33.84 |
| TSIR | 18.75 | 18.40 | 18.07 | 32.59 | 24.84 | 25.99 | 29.36 | 24.52 | 25.11 | 21.21 |
| TSUV | 21.89 | 16.59 | 17.35 | 32.55 | 22.91 | 22.19 | 21.07 | 22.35 | 22.24 | 21.82 |
| TSET | 27.56 | 25.52 | 25.17 | 42.46 | 31.47 | 32.30 | 33.96 | 31.30 | 31.74 | 28.43 |
| DW nm | 497.6 | 515.6 | 496.4 | 510.2 | 492.7 | 490.7 | 556.1 | 488.0 | 487.1 | 494.5 |
| Pe | 1.56 | 1.05 | 1.71 | 0.67 | 0.91 | 1.36 | 0.20 | 1.56 | 2.52 | 0.92 |

TABLE 2A

|  | 41 | 42 | 43 | 44 | 45 | 46 | 47 | 48 | 49 |
|---|---|---|---|---|---|---|---|---|---|
| $Fe_2O_3$ wt. % | 0.40 | 0.45 | 0.50 | 0.50 | 0.51 | 0.51 | 0.52 | 0.55 | 0.60 |
| FeO wt.% | 0.102 | 0.119 | 0.130 | 0.128 | 0.135 | 0.135 | 0.138 | 0.146 | 0.153 |
| Redox | 0.255 | 0.265 | 0.265 | 0.255 | 0.265 | 0.265 | 0.265 | 0.265 | 0.255 |
| CoO PPM | 102 | 110 | 135 | 100 | 115 | 100 | 179 | 95 | 110 |
| Se PPM | 6 | 11 | 12 | 8 | 12 | 1 | 15 | 4 | 10 |
| NiO PPM | 400 | 250 | 350 | 200 | 250 | 350 | 500 | 450 | 200 |
| $LT_A$ | 42.21 | 39.78 | 33.25 | 45.52 | 37.88 | 44.16 | 24.68 | 39.97 | 41.74 |
| TSIR | 46.29 | 42.82 | 39.15 | 40.24 | 38.92 | 38.97 | 37.28 | 36.21 | 34.40 |
| TSUV | 36.94 | 35.13 | 32.27 | 31.41 | 32.14 | 39.83 | 29.36 | 35.73 | 26.55 |
| TSET | 45.87 | 43.13 | 38.39 | 43.91 | 40.13 | 43.47 | 33.72 | 39.66 | 38.95 |
| DW nm | 558.8 | 547.0 | 524.8 | 505.5 | 553.6 | 491.1 | 520.9 | 548.1 | 515.8 |
| Pe % | 3.55 | 0.53 | 0.45 | 1.34 | 0.81 | 4.86 | 0.26 | 3.06 | 1.29 |

TABLE 2B

| | 50 | 51 | 52 | 53 | 54 | 55 | 56 | 57 | 58 |
|---|---|---|---|---|---|---|---|---|---|
| $Fe_2O_3$ wt. % | 0.60 | 0.65 | 0.70 | 0.71 | 0.71 | 0.75 | 0.80 | 0.82 | 0.82 |
| FeO wt.% | 0.153 | 0.172 | 0.185 | 0.181 | 0.181 | 0.198 | 0.212 | 0.209 | 0.209 |
| Redox | 0.255 | 0.265 | 0.265 | 0.255 | 0.255 | 0.265 | 0.265 | 0.255 | 0.255 |
| CoO PPM | 102 | 105 | 125 | 98 | 98 | 90 | 90 | 124 | 124 |
| Se PPM | 12 | 8 | 11 | 14 | 14 | 2 | 2 | 18 | 20 |
| NiO PPM | 100 | 250 | 300 | 100 | 50 | 450 | 500 | 200 | 150 |
| $LT_A$ | 44.50 | 40.06 | 34.15 | 42.58 | 43.92 | 39.70 | 37.97 | 33.86 | 34.07 |
| TSIR | 36.67 | 31.41 | 28.85 | 29.25 | 29.38 | 26.64 | 24.59 | 24.44 | 24.51 |
| TSUV | 25.84 | 29.86 | 26.54 | 21.68 | 21.74 | 29.99 | 28.40 | 17.49 | 16.96 |
| TSET | 40.17 | 36.98 | 32.95 | 36.03 | 36.72 | 34.09 | 32.10 | 29.55 | 29.62 |
| DW nm | 513.6 | 498.6 | 510.2 | 558.9 | 546.2 | 532.0 | 544.8 | 566.3 | 568.7 |
| Pe % | .97 | 1.92 | 1.12 | 3.37 | 1.91 | 3.06 | 4.52 | 6.16 | 6.2 |

TABLE 2C

| | 59 | 60 | 61 | 62 | 63 | 64 | 65 | 66 | 67 | 68 |
|---|---|---|---|---|---|---|---|---|---|---|
| $Fe_2O_3$ wt. % | 0.82 | 0.85 | 0.90 | 0.935 | 0.935 | 0.935 | 0.950 | 1.00 | 1.10 | 1.10 |
| FeO wt.% | 0.209 | 0.225 | 0.238 | 0.236 | 0.238 | 0.238 | 0.251 | 0.265 | 0.291 | 0.291 |
| Redox | 0.255 | 0.265 | 0.265 | 0.255 | 0.255 | 0.255 | 0.265 | 0.265 | 0.265 | 0.265 |
| CoO PPM | 124 | 135 | 140 | 170 | 160 | 150 | 130 | 110 | 160 | 100 |
| Se PPM | 20 | 12 | 15 | 19 | 19 | 19 | 10 | 5 | 12 | 8 |
| NiO PPM | 50 | 350 | 250 | 200 | 150 | 100 | 400 | 450 | 400 | 300 |
| $LT_A$ | 36.25 | 30.23 | 29.83 | 24.48 | 26.21 | 28.06 | 29.90 | 33.06 | 25.07 | 35.01 |
| TSIR | 24.72 | 22.82 | 21.27 | 20.36 | 20.25 | 20.55 | 19.58 | 18.20 | 15.62 | 15.84 |
| TSUV | 17.05 | 22.17 | 19.94 | 13.51 | 13.56 | 13.62 | 20.79 | 21.84 | 25.43 | 18.81 |
| TSET | 30.73 | 27.76 | 26.63 | 23.56 | 24.30 | 25.08 | 25.72 | 26.26 | 21.42 | 25.45 |
| DW nm | 562.6 | 532.9 | 517.1 | 502.6 | 505.4 | 509.2 | 535.9 | 530.5 | 503.4 | 536.8 |
| Pe % | 3.27 | 1.82 | 1.12 | 1.62 | 1.40 | 1.22 | 2.72 | 3.40 | 2.75 | 3.54 |

Referring to Tables 1 and 2, the present invention provides a neutral gray colored glass using a standard soda-lime-silica glass base composition and iron, cobalt and selenium, and optionally nickel as colorants. Not all of the examples are the same gray color as indicated by the dominant wavelengths (DW) and excitation purities (Pe). In the present invention, it is preferred that the glass be a neutral gray color characterized by dominant wavelengths in the range of 480 to 580 nanometers, preferably 485 to 560 nanometers, with an excitation purity of no higher than 8%, and preferably no higher than 3%. In addition, for both the nickel-free and nickel-bearing compositions, glasses having a dominant wavelength that is a complimentary wavelength within this wavelength range may also provide the desired neutral color, especially at an excitation purity of no higher than 3% and preferably no higher than as shown in Examples 1, 4, 9, 11 and 23.

In the present invention, the colorants used to produce a neutral, nickel-free gray colored glass with an $LT_A$ of up to 40% at a thickness of 3.9 millimeters includes 0.59 to 0.99 wt. % of the total glass $Fe_2O_3$ (total iron), no greater than 0.30 wt. % FeO; 60 to 180 PPM CoO and 5 to 30 PPM Se and preferably 0.71 to 0.935 wt. % $Fe_2O_3$ (total iron); 0.181 to 0.285 wt. % FeO; 75 to 150 PPM CoO and 11 to 24 PPM Se, and more preferably 0.75 to 0.86 wt. % $Fe_2O_3$; 0.18 to 0.25 wt. % FeO; 108 to 144 PPM CoO and 13 to 24 PPM Se.

In another embodiment of the present invention, the colorants used to produce a neutral, nickel-free gray colored glass with a luminous transmittance of 20 to 39.28 percent at a thickness of 3.9 millimeters include 0.6 to 0.935 wt. % $Fe_2O_3$ (total iron), up to 0.30 wt. % FeO; 60 to 180 PPM CoO and 5 to 30 PPM Se. This glass is characterized by dominant wavelengths in the range of 480 to 580 nanometers, and an excitation purity of no higher than 8%, and preferably by dominant wavelengths in the range of 485 to 540 nanometer, and an excitation purity of no higher than 3% at a thickness of 3.9 millimeters.

In the present invention, a nickel-bearing, neutral gray colored glass with a luminous transmittance of up to but less than 45% at a thickness of 3.9 millimeters may be attained by using as colorants: 0.35 to 1.1 wt. % of the total glass $Fe_2O_3$ (total iron), no greater than 0.30 wt. % FeO; 60 to 180 PPM CoO; 1 to 30 PPM Se; and 25 to 550 PPM NiO, and preferably 0.71 to 0.94 wt. % $Fe_2O_3$ (total iron); 0.181 to 0.24 wt. % FeO; 98 to 150 PPM CoO; 14 to 24 PPM Se, and a minimum of 50 PPM NiO.

This glass is characterized by dominant wavelengths in the range of 485 to 560 nanometers and the corresponding complementary wavelengths and an excitation purity of no higher than 8% at a thickness of 3.9 millimeters.

In another embodiment of the present invention, a nickel-bearing, neutral gray colored glass with a luminous transmittance of 20 to 44.5 percent at a thickness of 3.9 millimeters may be attained by using as colorants: 0.6 to 1.1 wt. % of the $Fe_2O_3$ (total iron), up to 0.30 wt. % FeO; 60 to 180 PPM CoO; 10 to 30 PPM Se; and 25 to 550 PPM NiO. This glass is characterized by dominant wavelengths in the range of 502 to 580 nanometers and an excitation purity of no higher than 8%, and preferably by dominant wavelengths in the range of 502 to 540 nanometers, and an excitation purity of no higher than 3% at a thickness of 3.9 millimeters.

The redox ratio for the glass of the present invention is maintained between about 0.20 to 0.30, and preferably between 0.24 to 0.28 which is the typical operating range for a conventional overhead fired melting operation. Higher redox levels may be attained by processes disclosed herein, but the use of higher redox ratios is preferably avoided to prevent excessive volatilization of selenium during melting.

Glass made by the float process typically ranges from a sheet thickness of about 1 millimeters to 10 millimeters. For the vehicle glazing applications, it is preferred that the glass sheets have a thickness within the thickness range of 1.8 to 6 millimeters.

If desired, ultraviolet radiation absorbing materials may be added to the glass compositions of the present invention to improve its solar performance. Although not limiting in the present invention, a total of up to 2.0 wt. % of oxides of cerium, vanadium, titanium and molybdenum and combinations thereof may be used as UV absorbers to reduce the TSUV of the glass. In a preferred embodiment of the invention, $TiO_2$ is the preferred UV absorber and may be added in an amount ranging from 0.1 to 1.0 wt. % of the glass composition, and more preferably 0.2 to 0.5 wt. %. It should be appreciated that in sufficient quantities, the cerium, vanadium, titanium and molybdenum may also operate as a colorant in the glass composition, with the cerium and titanium contributing a yellow component to the glass color, the vanadium contributing a green component to the glass color, and the molybdenum contributing a green component to the glass color.

Other variations as are known to those of skill in the art may be resorted to without departing from the scope of the invention as defined by the claims that follow.

We claim:

1. A neutral gray colored glass composition having a base glass portion comprising:

| | |
|---|---|
| $SiO_2$ | 66 to 75 percent by weight |
| $Na_2O$ | 10 to 20 percent by weight |
| CaO | 5 to 15 percent by weight |
| MgO | 0 to 5 percent by weight |
| $Al_2O_3$ | 0 to 5 percent by weight |
| $K_2O$ | 0 to 5 percent by weight | and a colorant portion consisting essentially of:

| | |
|---|---|
| $Fe_2O_3$ (total iron) | 0.6 to 1.1 percent by weight |
| FeO | up to 0.30 percent by weight |
| CoO | 60 to 180 PPM |
| Se | 10 to 30 PPM |
| NiO | 25 to 550 PPM | the glass having a luminous transmittance of 20 to 44.5 percent at a thickness of 3.9 millimeters.

2. The composition as in claim 1 wherein the FeO concentration is from 0.181 to 0.24 weight percent and the Se concentration is from 14 to 24 PPM.

3. A neutral gray colored glass composition having a base glass portion comprising:

| | |
|---|---|
| $SiO_2$ | 66 to 75 percent by weight |
| $Na_2O$ | 10 to 20 percent by weight |
| CaO | 5 to 15 percent by weight |
| MgO | 0 to 5 percent by weight |
| $Al_2O_3$ | 0 to 5 percent by weight |
| $K_2O$ | 0 to 5 percent by weight | and a colorant portion consisting essentially of:

| | |
|---|---|
| $Fe_2O_3$ (total iron) | 0.35 to 1.1 percent by weight |
| FeO | up to 0.30 percent by weight |
| CoO | 60 to 180 PPM |
| Se | 1 to 30 PPM |
| NiO | 25 to 550 PPM | the glass having a luminous transmittance of less than 45 percent at a thickness of 3.9 millimeters.

4. The composition of claim 3 wherein the color of the glass has dominant wavelengths in the range of 485 to 560 nanometers and the corresponding complementary wavelengths and an excitation purity of no higher than 8% at a thickness of 3.9 millimeters.

5. The composition of claim 4 wherein the glass has an excitation purity of no higher than 3 percent.

6. The composition as in claim 3 wherein the FeO concentration is from 0.181 to 0.24 weight percent and the Se concentration is from 14 to 24 PPM.

7. A neutral gray colored glass composition having a base glass portion comprising:

| | |
|---|---|
| $SiO_2$ | 66 to 75 percent by weight |
| $Na_2O$ | 10 to 20 percent by weight |
| CaO | 5 to 15 percent by weight |
| MgO | 0 to 5 percent by weight |
| $Al_2O_3$ | 0 to 5 percent by weight |
| $K_2O$ | 0 to 5 percent by weight | and a colorant portion consisting essentially of:

| | |
|---|---|
| $Fe_2O_3$ (total iron) | 0.35 to 1.1 percent by weight |
| FeO | 0.102 to 0.30 percent by weight |
| CoO | 60 to 180 PPM |
| Se | 14 to 24 PPM |
| NiO | 25 to 550 PPM | the glass having a luminous transmittance of less than 45 percent at a thickness of 3.9 millimeters.

8. The composition of claim 7 wherein the color of the glass has dominant wavelengths in the range of 502 to 580 nanometers and an excitation purity of no higher than 8% at a thickness of 3.9 millimeters.

9. The composition of claim 8 wherein the color of the glass has dominant wavelengths in the range of 502 to 540 nanometers and an excitation purity of no higher than 3 percent.

10. The composition as in claim 7 further including additional ultraviolet absorbing material.

11. The composition as in claim 10 wherein said ultraviolet absorbing material is an oxide of material selected from a group consisting essentially of cerium, vanadium, titanium and molybdenum and combinations thereof in an amount up to 2.0 wt. % of the glass composition.

12. The composition as in claim 11 wherein said ultraviolet absorbing material includes TiO$_2$ in an amount from 0.1 to 1.0 wt. %.

13. The composition as in claim 12 wherein said TiO$_2$ is in an amount from 0.2 to 0.5 wt. %.

14. A glass sheet made from the composition as recited in claim 1.

15. The glass sheet as in claim 14 wherein the sheet has a thickness between 3 to 6 mm.

16. The glass sheet as in claim 14 wherein the color of the glass has dominant wavelengths in the range of 502 to 540 nanometers and an excitation purity of no higher than 8% at a thickness of 3.9 millimeters.

17. The glass sheet as in claim 16 wherein the color of the glass has dominant wavelengths in the range of 502 to 540 nanometers and an excitation purity of no higher than 3 percent.

18. A neutral gray colored glass composition having a base glass portion comprising:

| | |
|---|---|
| SiO$_2$ | 66 to 75 percent by weight |
| Na$_2$O | 10 to 20 percent by weight |
| CaO | 5 to 15 percent by weight |
| MgO | 0 to 5 percent by weight |
| Al$_2$O$_3$ | 0 to 5 percent by weight |
| K$_2$O | 0 to 5 percent by weight | and a colorant portion consisting essentially of:

| | |
|---|---|
| Fe$_2$O$_3$ (total iron) | 0.6 to 1.1 percent by weight |
| FeO | 0.102 to 0.30 percent by weight |
| CoO | 60 to 180 PPM |
| Se | 10 to 24 PPM |
| NiO | 25 to 550 PPM | the glass having a luminous transmittance of 20 to 44.5 percent at a thickness of 3.9 millimeters.

19. The composition as in claim 18 wherein the Fe$_2$O$_3$ concentration is from 0.71 to 0.94 weight percent, the FeO concentration is from 0.181 to 0.24 weight percent, the CoO concentration is from 98 to 150 PPM and the Se concentration is from 14 to 24 PPM and the NiO concentration is at least 50 PPM and the glass is characterized by dominant wavelengths in the range of 502 to 580 nanometers and an excitation purity of no higher than 8% at a thickness of 3.9 millimeters.

20. The composition as in claim 18 further including an additional ultraviolet absorber which is an oxide of a material selected from a group consisting essentially of cerium, vanadium, titanium and molybdenum and combination thereof in an amount up to 2.0 wt. % of the glass composition.

21. The composition as in claim 20 wherein said ultraviolet absorber includes TiO$_2$ is in an amount from 0.1 to 1.0 wt. %.

* * * * *